US010302152B2

(12) United States Patent
Yamamori

(10) Patent No.: US 10,302,152 B2
(45) Date of Patent: May 28, 2019

(54) DRIVING POWER TRANSMISSION DEVICE

(71) Applicant: JTEKT Corporation, Osaka-shi (JP)

(72) Inventor: Motoyasu Yamamori, Nagoya (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 15/959,711

(22) Filed: Apr. 23, 2018

(65) Prior Publication Data

US 2018/0238403 A1 Aug. 23, 2018

Related U.S. Application Data

(62) Division of application No. 14/525,402, filed on Oct. 28, 2014, now Pat. No. 9,995,348.

(30) Foreign Application Priority Data

Oct. 29, 2013 (JP) .................. 2013-224085
Oct. 29, 2013 (JP) .................. 2013-224086
Oct. 29, 2013 (JP) .................. 2013-224087

(51) Int. Cl.
*F16D 25/12* (2006.01)
*F04C 2/10* (2006.01)
(Continued)

(52) U.S. Cl.
CPC ............. *F16D 25/14* (2013.01); *F04C 2/102* (2013.01); *F04C 2/105* (2013.01); *F04C 14/06* (2013.01);
(Continued)

(58) Field of Classification Search
None
See application file for complete search history.

(56) References Cited

U.S. PATENT DOCUMENTS 4,443,169 A * 4/1984 Merz ................. F04C 15/066
418/15
4,449,898 A * 5/1984 Lambeck .............. F04C 2/105
137/625.2
(Continued)

FOREIGN PATENT DOCUMENTS

CN 102869903 A 1/2013
EP 2 163 764 A2 3/2010
(Continued)

OTHER PUBLICATIONS

Extended European Search Report dated Sep. 22, 2015 in Patent Application No. 14190604.0.
(Continued)

*Primary Examiner* — Colby M Hansen
(74) *Attorney, Agent, or Firm* — Oblon, McClelland, Maier & Neustadt, L.L.P.

(57) ABSTRACT

A driving power transmission device includes a fluid pressure type clutch device that transmits driving power between two shaft members, and a pump that supplies a fluid to the clutch device. The pump includes a pump that makes a pressure of sucked fluid high; a first flow passage through which the fluid according to a pressure discharged from the pump is supplied to the clutch device during a driving of the pump; a second flow passage through which the fluid discharged from the pump is held during a stop of the pump and a pressing force is applied to the clutch device by the fluid to be held; and a switching valve that is switchable between a normal mode where a discharge port of the pump communicates with the first flow passage and a locking mode where the discharge port of the pump communicates with the second flow passage.

11 Claims, 10 Drawing Sheets

(51) Int. Cl.
  *F04C 14/06* (2006.01)
  *F04C 14/14* (2006.01)
  *F16D 48/02* (2006.01)
  *F04C 14/24* (2006.01)
  *F04C 15/06* (2006.01)
  *F01C 21/10* (2006.01)
  *F04C 15/00* (2006.01)

(52) U.S. Cl.
  CPC .............. *F04C 14/14* (2013.01); *F04C 14/24* (2013.01); *F04C 15/064* (2013.01); *F01C 21/108* (2013.01); *F04C 15/0061* (2013.01); *Y10T 137/86002* (2015.04); *Y10T 137/86123* (2015.04)

(56) References Cited

U.S. PATENT DOCUMENTS

| | | | | |
|---|---|---|---|---|
| 5,722,815 | A * | 3/1998 | Cozens | F04C 2/102 417/288 |
| 6,386,836 | B1 * | 5/2002 | Johnson | F04C 11/001 417/310 |
| 2009/0277711 | A1 | 11/2009 | Hoffmann et al. | |
| 2010/0059315 | A1 | 3/2010 | Burns et al. | |
| 2011/0194954 | A1 | 8/2011 | Sakata | |
| 2014/0241917 | A1 * | 8/2014 | Suzuki | F04C 2/102 417/410.4 |

FOREIGN PATENT DOCUMENTS

| | | |
|---|---|---|
| JP | 63-176683 A | 7/1988 |
| JP | 7-8654 U | 2/1995 |
| JP | 2000-249215 A | 9/2000 |
| JP | 2001-263467 A | 9/2001 |
| JP | 2007-278435 A | 10/2007 |
| JP | 2008-114674 | 5/2008 |
| JP | 2009-269605 | 11/2009 |
| JP | 2011-52632 A | 3/2011 |
| JP | 2012-189012 A | 10/2012 |

OTHER PUBLICATIONS

Office Action dated Jul. 4, 2017 in Japanese Patent Application No. 2013.224085 (with English language translation).

Office Action dated Jul. 18, 2017 in Japanese Patent Application No. 2013-224087 (with English translation).

Office Action dated Jul. 11, 2017 in Japanese Patent Application No. 2013-224086 (with English Translation).

Combined Chinese Office Action and Search Report dated Dec. 4, 2017 in Chinese Patent Application No. 201410592439.8, 26 pages.

* cited by examiner

DRIVING POWER TRANSMISSION DEVICE

CROSS REFERENCE TO RELATED APPLICATIONS

The present application is a Divisional application of U.S. patent application Ser. No. 14/525,402 filed on Oct. 28, 2014, which claims priority to Japanese patent application 2013-224085, filed on Oct. 29, 2013; Japanese patent application 2013-224086, filed on Oct. 29, 2013; and Japanese patent application 2013-224087, filed on Oct. 29, 2013, the entire contents of which are hereby incorporated by reference.

BACKGROUND

The present invention relates to a pump apparatus with a switching valve that includes a switching valve that is switchable among a plurality of destinations of a fluid and discharges a sucked fluid to a switched destination.

For example, in a drive device for an automobile described in Patent Document 1, a hydraulic control device that controls a supply of hydraulic pressure from a pump via a plurality of magnetic valves to a plurality of hydraulic cylinders, respectively, and performs connection and disconnection of a plurality of wet multiple disc clutches, respectively, is described.

Additionally, the present invention relates to a driving power transmission device that transmits driving power between two shaft members.

For example, in a driving power transmission device for an automobile (driving power distribution device) described in Patent Document 2, a driving power transmission device including an auxiliary transmission that shifts the power from an input shaft and transmits the power to a main output shaft, and a friction clutch that transmits a torque from the main output shaft to an auxiliary output shaft is described.

[Patent Document 1] JP-A-2009-269605
[Patent Document 2] JP-A-2008-114674

SUMMARY

In the hydraulic control device described in the above Patent Document 1, complicated drive control is required because a plurality of actuators that drive the pump and the plurality of magnetic valves, respectively, are provided. Additionally, costs tend to increase because the number of devices is large.

Additionally, in the driving power transmission device described in the above Patent Document 2, in the case of a locking mode where an engaged state of the friction clutch is maintained, it is necessary to continue supplying a high current to a motor that actuates the friction clutch. For this reason, fuel consumption tends to increase for power storage.

The invention has been made in view of such a situation, and an object thereof is to provide a pump apparatus with a switching valve that can perform rotational driving of a pump and rotational driving of a switching valve with one actuator, respectively.

Additionally, another object of the invention is to provide a driving power transmission device that can suppress current consumption.

According to one advantageous aspect of the present invention, there is provided a pump apparatus with a switching valve comprising:

an actuator that is rotationally driven;
a pump that discharges a fluid sucked by rotational driving of the actuator;
a switching valve that is changed in phase by the rotational driving of the actuator so as to be switchable among a plurality of destinations of the fluid discharged from a pump chamber of the pump; and
a driving power interrupting device for a valve that is switchable between a state where rotational driving power of the actuator is transmitted to the switching valve and a state where the rotational driving power of the actuator is interrupted.

Accordingly, the rotational driving of the pump and the rotational driving of the switching valve can be performed by one actuator by performing switching using the driving power interrupting device for a valve. Thus, the drive control of one actuator becomes simple, and the high-speed operation of the pump apparatus with a switching valve is possible.

Additionally, since the number of devices can be reduced, remarkable cost reduction can be achieved.

The driving power interrupting device for a valve may transmit the rotational driving power of the actuator in one rotational direction to the switching valve and may interrupt the rotational driving power of the actuator in the other rotational direction with respect to the switching valve.

Accordingly, the switching valve can be reliably rotationally driven and rotationally stopped.

The actuator may rotationally drive the pump with the rotational driving power of the actuator in one rotational direction, and the driving power interrupting device for a valve may transmit the rotational driving power of the actuator in the other rotational direction to the switching valve.

Accordingly, the pump and the switching valve can be reliably switched and rotationally driven.

The driving power interrupting device for a valve may be a one-way clutch that transmits the rotational driving power of the actuator in the other rotational direction to the switching valve and interrupts the rotational driving power of the actuator in one rotational direction, and the pump apparatus with a switching valve may include a driving power interrupting device for a pump that is a one-way clutch and transmits the rotational driving power of the actuator in one rotational direction to the pump and interrupts the rotational driving power of the actuator in the other rotational direction.

Accordingly, the fluid can be reliably supplied to a predetermined destination without simultaneously actuating the rotational driving of the pump and the rotational driving of the switching valve.

The pump apparatus with a switching valve may include a housing that rotatably houses the switching valve, the switching valve may have a braking device that is switchable between a state where the rotation thereof with respect to the housing is constrained and a state where the rotation thereof with respect to the housing is released, the braking device may release the switching valve when the actuator is rotationally driven in one rotational direction, and the braking device may constrain the switching valve when the actuator is rotationally driven in the other rotational direction.

Accordingly, the rotational phase detection and positioning of the switching valve can be reliably performed, and the switching of the switching valve can be reliably performed.

A rotational axis of the actuator, a rotational axis of the pump, and a rotational axis of the switching valve may be coaxially provided, an end surface of the switching valve may form a side wall of a pump chamber of the pump, and the pump apparatus with a switching valve may include a housing that houses the pump and the switching valve.

Accordingly, the pump apparatus with a switching valve can be downsized.

At least one of the switching valve and a surface of the housing facing the switching valve may be provided with a circumferential groove into which a fluid discharged from the pump chamber is made to flow, and the housing may be provided with a communication hole that communicates a pressure detecting mechanism with the circumferential groove.

Accordingly, the pressure of each of the plurality of destinations of the fluid can be detected by one pressure detecting mechanism.

The pump apparatus with a switching valve may include a side plate that forms a side wall of the pump chamber opposite to the switching valve, the pump may have an outer rotor and an inner rotor and may include a cam ring that eccentrically and rotatably supports the outer rotor with respect to the inner rotor, and the switching valve, the side plate, and the cam ring may rotate integrally.

Accordingly, the pump and the switching valve can be integrated side by side in the direction of the rotational axis, and the pump apparatus with a switching valve can be further downsized.

The side plate may be housed in the housing.

A back-pressure chamber, into which the fluid discharged from the pump chamber flows, and applying a pressing force to the pump side to the side plate with the pressure of the fluid, may be provided between an end surface of the side plate opposite to the pump chamber in a direction of a rotational axis and the housing facing the end surface of the side plate in the direction of the rotational axis.

Since the fluid has a high pressure during the operation of the pump, there is a concern that the fluid may leak if a gap is formed between the pump and the side plate or between the pump and the housing. However, the positional relationship between the side plate and the housing can be maintained by the pressing force generated by the back-pressure chamber, and the leaking of the fluid from the above gap can be prevented.

The pump apparatus with a switching valve may include a thrust bearing arranged at the housing so as to sandwich the pump, the switching valve, and the side plate in the direction of the rotational axis.

Since there is no pumping action when the switching valve is rotationally driven, it is difficult to integrally rotate the side plate, the pump, and the switching valve. However, since the thrust bearing is provided, the side plate, the pump, and the switching valve can be integrally and smoothly rotated without rattling.

The switching valve may be changed in phase so as to be switchable among a plurality of return points made to communicate with a suction side of the pump chamber of the pump.

Accordingly, the fluid can be smoothly returned and reused.

The pump apparatus with a switching valve may include a control device that controls rotational driving of the actuator on the basis of the pressure of the fluid detected by the pressure detecting mechanism.

Accordingly, the driving of the actuator can be exactly controlled so that the pressure of the fluid becomes proper.

The pump apparatus with a switching valve may include a phase detecting mechanism capable of detecting and positioning the phase.

Accordingly, a plurality of destinations of the fluid discharged from the pump chamber can be reliably switched.

The pump apparatus with a switching valve may include a control device that controls rotational driving of the actuator on the basis of the phase of the switching valve detected by the phase detecting mechanism.

Accordingly, the driving of the actuator can be exactly controlled so that the destination of the fluid becomes accurate.

The phase detecting mechanism may be constituted of a sensor that is fixed to the housing that rotatably houses the rotary valve and is provided to make the amount of protrusion from an inner peripheral surface of the housing to a radial inner side variable, and a recess that that is formed in an outer peripheral surface of the switching valve and is locked to the sensor in a circumferential direction.

Since a high pressure is applied to the switching valve during the operation of the pump, there is a concern that the switching valve may idle only with the driving power interrupting device for a valve. However, since the recess to be locked in the circumferential direction to the sensor is provided, the idling of the switching valve can be prevented.

The pump is a rotary pump that makes the pressure of the sucked fluid high through the rotational driving of the actuator to discharge the high-pressure fluid, and the pump apparatus with a switching valve of the invention further includes a speed change gear that makes a reduction ratio when the rotational driving power of the actuator is transmitted to the rotary pump greater than a reduction ratio when the rotational driving power of the actuator is transmitted to the switching valve.

Accordingly, the reduction ratio when the rotational driving power of the actuator is transmitted to the rotary pump is greater than the reduction ratio when the rotational driving power is transmitted to the switching valve. Thus, the rotational driving of the rotary pump and the switching valve can be performed, respectively, by one actuator. Hence, the pump apparatus with a switching valve can be simply controlled, and an improvement in pump efficiency and an improvement in valve positioning accuracy can be made compatible.

The speed change gear may be a reduction gear coupled to the switching valve, and the rotary pump may be directly connected to the actuator.

Accordingly, since the speed change gear can be simply configured, cost reduction of the pump apparatus with a switching valve can be achieved.

The speed change gear may include a first reduction gear coupled to the switching valve and a second reduction gear coupled to the rotary pump. Accordingly, the pumping pressure of the rotary pump can be increased.

A rotational axis of the actuator, a rotational axis of the rotary pump, a rotational axis of the switching valve, and a rotational axis of the speed change gear may be coaxially provided, an end surface of the switching valve may form a side wall of the pump chamber, and the pump apparatus with a switching valve may include a housing that houses the rotary pump, the switching valve, and the speed change gear.

Accordingly, the pump apparatus with a switching valve can be downsized.

The pump apparatus with a switching valve may include a side plate that forms a side wall of the pump chamber opposite to the switching valve, the rotary pump may have an outer rotor and an inner rotor and include a cam ring that eccentrically and rotatably supports the outer rotor with respect to the inner rotor, and the switching valve, the side plate, the cam ring, and the speed change gear rotate integrally.

Accordingly, the rotary pump and the switching valve can be integrated side by side in the direction of the rotational axis, and the pump apparatus with a switching valve can be further downsized.

The pump apparatus with a switching valve may include a thrust bearing arranged at the housing so as to sandwich the rotary pump, the switching valve, the side plate, and the speed change gear in the direction of the rotational axis.

Since there is no pumping action when the switching valve is rotationally driven, it is difficult to integrally rotate the side plate, the rotary pump, and the switching valve. However, since the thrust bearing is provided, the side plate, the rotary pump, and the switching valve can be integrally and smoothly rotated without rattling.

According to another advantageous aspect of the present invention, there is provided a driving power transmission device comprising:

a fluid pressure type clutch device that transmits driving power between two shaft members; and a pump apparatus that supplies a fluid to the clutch device wherein the pump apparatus includes:

a pump that makes a pressure of sucked fluid high to discharge the fluid with a high-pressure;

a first flow passage through which the fluid according to a pressure discharged from the pump is supplied to the clutch device during a driving of the pump;

a second flow passage through which the fluid discharged from the pump is held during the stop of the pump and a pressing force is applied to the clutch device by the fluid to be held; and a switching valve that is switchable between a normal mode where a discharge port of the pump is made to communicate with the first flow passage and a locking mode where the discharge port of the pump is made to communicate with the second flow passage.

Accordingly, the normal mode and the locking mode are switched by the switching valve. Thus, the pressure of the fluid can be maintained even if the driving of the pump apparatus is stopped in the locking mode. Accordingly, the current consumption of the driving power transmission device can be suppressed.

The second flow passage may be provided with a check valve that regulates a back flow of the fluid to the pump side during the stop of the pump and permits the supply of the fluid to the clutch device side during the driving of the pump.

Accordingly, the leak of the fluid can be suppressed in the locking mode, and the pressure of the fluid can be maintained for a prolonged period of time.

The driving power transmission device may include a pressure accumulation device that accumulates the fluid when the pressure of the fluid within the second flow passage is equal to or higher than a predetermined pressure and that discharges the accumulated fluid to the second flow passage during the stop of the pump when the pressure of the fluid within the second flow passage is reduced.

Accordingly, the pressure of the fluid can be maintained for a prolonged period of time. Hence, the driving of the pump apparatus can be stopped for a long time, and the current consumption of the driving power transmission device can be further suppressed.

The driving power transmission device may include an actuator that is rotationally driven, and the switching valve may be a rotary valve that is changed in phase by the rotational driving of the actuator so as to be switchable between the normal mode and the locking mode.

Accordingly, the normal mode and the locking mode can be easily and reliably switched.

The pump may be a rotary pump that includes an outer rotor and an inner rotor that form a pump chamber in a radially facing region and makes the pressure of sucked fluid high through the rotational driving of the actuator to discharge the high-pressure fluid. A rotational axis of the actuator, a rotational axis of the pump, and a rotational axis of the rotary valve may be coaxially provided, and an end surface of the rotary valve may form a side wall of the pump chamber.

Accordingly, the rotary pump and the rotary valve can be integrated side by side in the direction of the rotational axis, and the driving power transmission device can be further downsized.

The first flow passage may be provided with a drain port that communicates with the pump suction side when the switching valve is in the normal mode, and a flow control valve may be provided so as to be switchable between a state where the fluid is supplied from the pump to the clutch device side by closing the drain port when the switching valve is in the normal mode and the pump is driven and a state where the fluid is discharged from the first flow passage to the suction side of the pump by opening the drain port when the switching valve is in the normal mode and the pump is stopped.

Accordingly, the pressure of the fluid can be rapidly lowered from the switching place, and the driving power transmission device can be actuated at a high speed.

The flow control valve may be biased to the switching valve side by a biasing member, the flow control valve may be provided with a throttle that makes the pressure of the fluid of the flow control valve on the clutch device side greater than the pressure of the fluid of the flow control valve on the switching valve side in a state where the fluid is supplied, and the flow control valve may be moved to a position where the drain port is closed against a biasing force of the biasing member, by a pressure difference of the fluid.

Accordingly, the fluid can be smoothly supplied to the switching place and the driving power transmission device can be actuated at a higher speed.

The clutch device may be applied to a differential gear with limited differential that distributes the driving power of a driving source to a drive shaft on a front wheel side and a drive shaft on a rear wheel side and limits the differential between the drive shaft on the front wheel side and the drive shaft on the rear wheel side, and the clutch device may limit the differential between the drive shaft on the front wheel side and the drive shaft on the rear wheel side according to an engagement force.

Accordingly, a center differential function of a vehicle can be enhanced.

The clutch device may be provided between a drive shaft on a front wheel side and a drive shaft on a rear wheel side and may distribute the driving power of a driving source to the front wheel side and the rear wheel side according to an engagement force.

Accordingly, a coupling function of the vehicle can be enhanced.

The clutch device may be applied to a differential gear with limited differential that distributes the driving power of a driving source to a drive shaft on a left wheel side and a drive shaft on a right wheel side and limits the differential between the drive shaft on the left wheel side and the drive shaft on the right wheel side, and the clutch device may limit the differential between the drive shaft on the left wheel side and the drive shaft on the right wheel side according to an engagement force.

Accordingly, front differential and rear differential functions of the vehicle can be enhanced.

The driving power transmission device may include an input shaft that receives driving power input from a driving source; and an auxiliary transmission that includes a cylinder device driven according to a fluid pressure difference between two partitioned regions, changes a speed change ratio of the driving power input to the input shaft, according to the position of a piston of the cylinder device, and transmits the changed driving power to a wheel, the pump apparatus may include third and fourth flow passages that communicate with the respective regions of the cylinder device, and the switching valve may be switchable among the normal mode, the locking mode, and an auxiliary transmission switching mode where the cylinder device is driven by making a discharge port and a suction port of the pump communicate within the third and fourth flow passages, respectively.

Accordingly, a function of the auxiliary transmission of the vehicle can be increased.

BRIEF DESCRIPTION OF DRAWINGS

FIG. 1B is a view illustrating the state of a flow control valve when hydraulic oil is supplied in the normal mode of the pump apparatus with a switching valve.

Figure 1A:
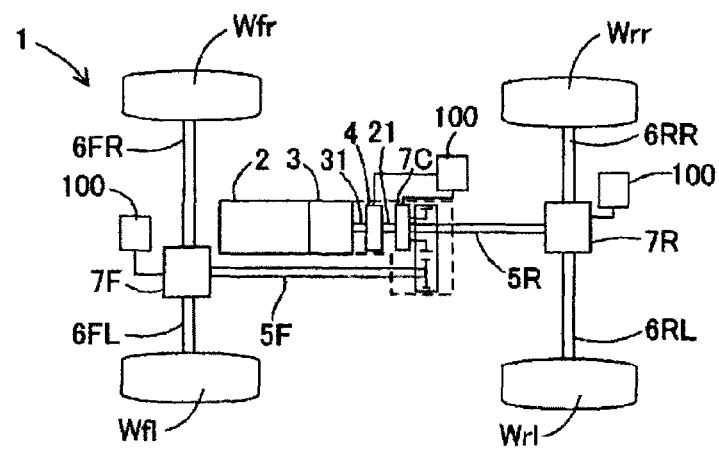
FIG. 1A is a view illustrating a schematic configuration of a drive system of a vehicle on which a pump apparatus with a switching valve related to an embodiment is mounted.

DETAILED DESCRIPTION OF EXEMPLIFIED EMBODIMENTS (Outline of Vehicle)

Hereinafter, an embodiment of a pump apparatus with a switching valve (driving power transmission device) of the invention will be described referring to the drawings. First, schematic configurations of drive systems of vehicles 1 and 8 on which a pump apparatus 100 with a switching valve of the present embodiment is mounted will be described with reference to FIGS. 1A and 1B. In addition, in FIG. 1B, the same components as those of FIG. 1A will be designated by the same reference numerals, and the detailed description thereof will be omitted.

As illustrated in FIG. 1A, the vehicle 1 is a four-wheel drive car, and is configured to include an engine 2 (equivalent to a driving source of the invention), a transmission 3, an auxiliary transmission 4, a propeller shaft 5F on front wheels Wfl and Wfr side, a propeller shaft 5R on rear wheels Wrl and Wrr side, a drive shaft 6FL on a front left wheel Wfl side, a drive shaft 6FR on a front right wheel Wfr side, a drive shaft 6RL on a rear left wheel Wrl side, a drive shaft 6RR on a rear right wheel Wrr side, a front limited slip differential (LSD) 7F, a center LSD 7C, a rear LSD 7R, and three pump apparatuses 100 with a switching valve. The respective shafts 5F, 5R, 6FL, 6FR, 6RL, and 6RR are equivalent to a "drive shaft" of the invention.

Each of the LSDs 7F, 7C, and 7R includes a hydraulic clutch device 7 (refer to FIG. 4) that has a multiple disc clutch 72 and a hydraulic cylinder device 73 for driving power transmission.

The front LSD 7F is a differential gear with limited differential that distributes the driving power of the engine 2 to the drive shaft 6FL on the front left wheel Wfl side and the drive shaft 6FR on the front right wheel Wfr side and that limits the differential between the drive shaft 6FL on the front left wheel Wfl side and the drive shaft 6FR on the front right wheel Wfr side according to the engagement force of the clutch device 7.

The center LSD 7C is a differential gear with limited differential that operates similarly to the front LSD 7F, on the propeller shaft 5F on the front wheels Wfl and Wfr side and the propeller shaft 5R on the rear wheels Wrl and Wrr side.

The rear LSD 7R is a differential gear with limited differential that operates similarly to the front LSD 7F, on the drive shaft 6RL on the rear left wheel Wrl side and the drive shaft 6RR on the rear right wheel Wrr side.

The auxiliary transmission 4 includes a hydraulic cylinder device 41 (refer to FIG. 4) that is driven according to a fluid pressure difference between two partitioned regions 41a and 41b. The cylinder device 41 of the auxiliary transmission 4 is operated by the pump apparatus 100 with a switching valve that operates the clutch device 7 of the center LSD 7C.

Figure 2:
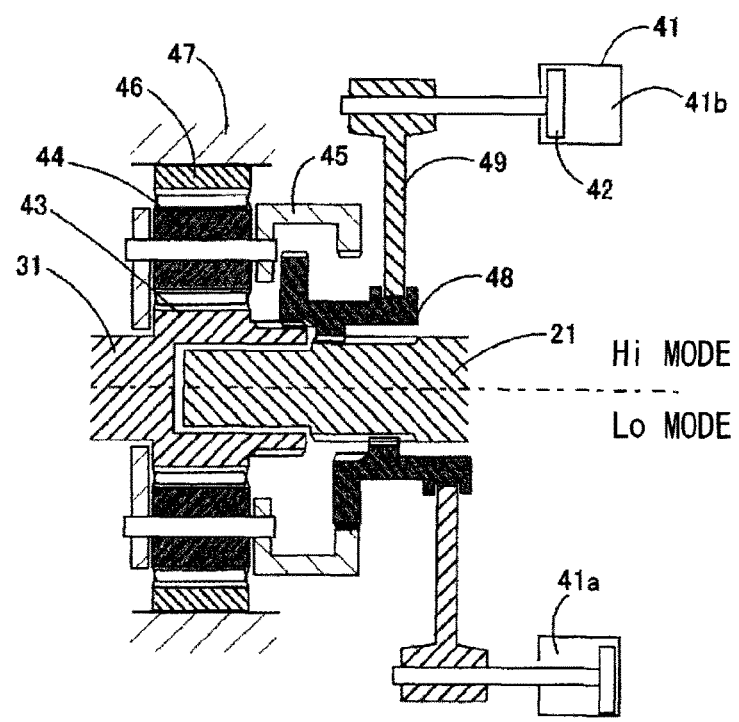
FIG. 2 is a cross-sectional view illustrating a schematic structure of an auxiliary transmission.

Here, the schematic structure of the auxiliary transmission 4 will be described with reference to FIG. 2. The auxiliary transmission 4 includes a planetary gear mechanism consisting of a sun gear 43, a planetary gear 44, a planetary carier 45, and a ring gear 46. The sun gear 43 is formed on one end side of an input shaft 31 from the transmission 3. The ring gear 46 is fixed to an inner wall of a housing 47 of the auxiliary transmission 4. The input shaft 31 and an output shaft 21 are coaxially arranged and are configured so as to be able to be spline-coupled via a coupling member 48. Additionally, the planetary carrier 45 and the output shaft 21 are also configured so as to be able to be spline-coupled via the coupling member 48. Then, the coupling member 48 is engaged with a shift fork 49 coupled to a piston 42 of the cylinder device 41.

For example, as illustrated above a one-dot chain line of FIG. 2, when the piston 42 of the cylinder device 41 is located on a region 41a side, the input shaft 31 and the output shaft 21 are coupled via the coupling member 48. Thus, a speed change ratio of driving power input to the input shaft 31 is 1/1, and is in a Hi mode where the driving power is output to the output shaft 21 without deceleration. Additionally, as illustrated below the one-dot chain line of FIG. 2, when the piston 42 of the cylinder device 41 is located on a region 41b side, the planetary carrier 45 and the output shaft 21 are coupled via the coupling member 48. Thus, the speed change ratio of the driving power input to the input shaft 31 is in a Lo mode where the driving power is reduced in a reduction ratio according to the numbers of teeth of the sun gear 43, the planetary gear 44, and the ring gear 46 and is output to the output shaft. Also, switching is made from the Hi mode to the Lo mode by moving the position of the piston 42 from the region 41b side to the region 41a side and switching is made from the Lo mode to the Hi mode by moving the position of the piston 42 from the region 41a side to the region 41b side.

A driving power transmission device is constituted of the front LSD 7F and the pump apparatus 100 with a switching valve that operates the clutch device 7 of the front LSD 7F. The same also applies for the rear LSD 7R. A driving power transmission device is constituted of the center LSD 7C, the auxiliary transmission 4, the pump apparatus 100 with a switching valve, and the input shaft 31 from the transmission 3.

In the vehicle 1, the driving power from the engine 2 or the like is transmitted to the center LSD 7C via the transmission 3 and the auxiliary transmission 4. Then, the center LSD 7C distributes the transmitted driving power to the propeller shafts 5F and 5R. Additionally, the differential of the propeller shafts 5F and 5R is limited according to the engagement force of the multiple disc clutch 72 of the clutch device 7 that is operated by hydraulic oil (equivalent to a "fluid" of the invention) supplied from the pump apparatus 100 with a switching valve.

The driving power distributed to propeller shafts 5F and 5R is transmitted to the front LSD 7F and the rear LSD 7R. The front LSD 7F distributes the transmitted driving power to the drive shafts 6FL and 6FR according to the same operation as the center LSD 7C. The rear LSD 7R distributes the transmitted driving power to the drive shafts 6RL and 6RR according to the same operation as the center LSD 7C.

Figure 1B:
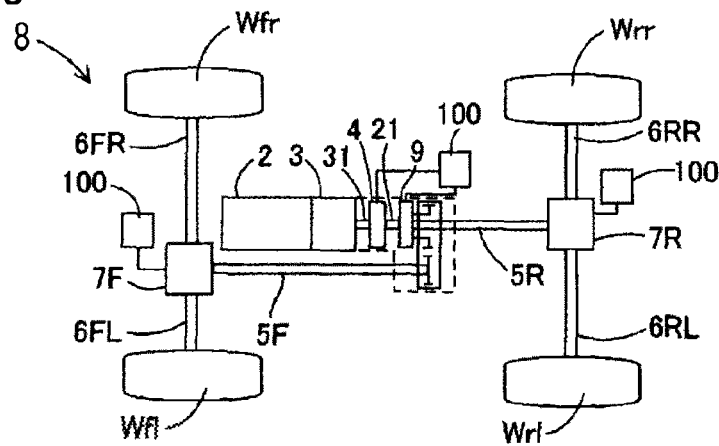
FIG. 1B is a view illustrating a schematic configuration of a drive system of another vehicle on which the pump apparatus with a switching valve related to the embodiment is mounted.

The vehicle 8 illustrated in FIG. 1B is configured to include a hydraulic coupling device 9 instead of the center LSD 7C of the vehicle 1 illustrated in FIG. 1A. The coupling device 9 includes the clutch device 7 that has the multiple disc clutch 72 and the cylinder device 73 for driving power transmission. Also, the driving power transmission device is constituted of the coupling device 9 and the pump apparatus 100 with a switching valve that operates the clutch device 7 of the coupling device 9.

The coupling device 9 is a device that is provided between the propeller shaft 5F on the front wheels Wfl and Wfr side and the propeller shaft 5R on the rear wheels Wrl and Wrr side and distributes driving power to the propeller shaft 5F on the front wheels Wfl and Wfr side, and the propeller shaft 5R on the rear wheels Wrl and Wrr side according to the engagement force of the clutch device 7.

Figure 3:
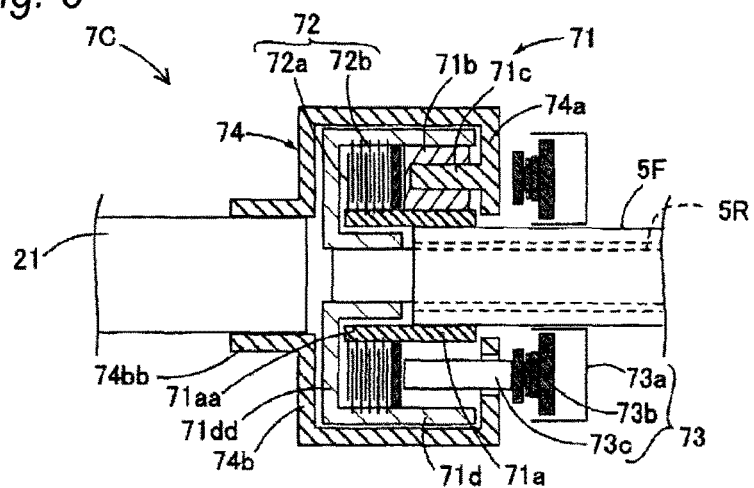
FIG. 3 is a cross-sectional view illustrating a detailed structure of a center LSD of a driving power transmission device.

Here, the detailed structure of the center LSD 7C will be described as an example with reference to FIG. 3. As illustrated in FIG. 3, the center LSD 7C is configured to include a planetary gear mechanism 71, the multiple disc clutch 72, the cylinder device 73, the housing 74, and the like.

The planetary gear mechanism 71 includes a sun gear 71a, a planetary gear 71b, a carrier 71c, and an internal gear 71d. The multiple disc clutch 72 includes an inner plate 72a and an outer plate 72b. The cylinder device 73 includes a cylinder 73a, a piston 73b, and a rod 73c.

The propeller shaft 5F on the front wheels Wfl and Wfr side is fitted to the center of the sun gear 71a. Additionally, the sun gear 71a is formed with a cylindrical portion 71aa extending in the direction of a rotational axis. Also, a plurality of the inner plates 72a are fixed to an outer periphery of the cylindrical portion 71aa at predetermined intervals.

The carrier 71c is integrated with an end surface 74a of the housing 74 on the propeller shaft 5F side. An end surface 74b of the housing 74 opposite to the end surface 74a on the propeller shaft 5F side is formed with a cylindrical portion 74bb extending in the direction of the rotational axis. Also, the output shaft 21 from the auxiliary transmission 4 is fitted to an inner periphery of the cylindrical portion 74bb.

The internal gear 71d is formed with a cylindrical portion 71dd that covers the multiple disc clutch 72, goes around an inner peripheral side of the sun gear 71a, and has a U-shaped cross-section. Also, a plurality of the outer plates 72b are fixed to the inner periphery of the cylindrical portion 71dd facing the outer periphery of the cylindrical portion 71aa of the sun gear 71a so as to be arranged alternately with the inner plates 72a. Additionally, a shaft (in FIG. 3, denoted by 5R for convenience) coupled to the propeller shaft 5R on the rear wheels Wrl and Wrr side via a gear mechanism is fitted to the inner periphery of the cylindrical portion 71dd facing the inner periphery of the cylindrical portion 71aa of the sun gear 71a. The shaft 5R is inserted through a hollow inner peripheral portion of the propeller shaft 5F.

The cylinder 73a and the piston 73b are arranged parallel to each other on the outer side, in the direction of the rotational axis, of the end surface 74a of the housing 74 on the propeller shaft 5R side. Also, the rod 73c is arranged within the planetary gear 71b so as to press the inner plates 72a and the outer plates 72b in an engageable manner.

(Schematic Configuration of Driving Power Transmission Device)

Next, the driving power transmission device constituted of the center LSD 7C, the pump apparatus 100 with a switching valve that operates the clutch device 7 of the center LSD 7C and the auxiliary transmission 4 will be described with reference to FIG. 4.

Figure 4:
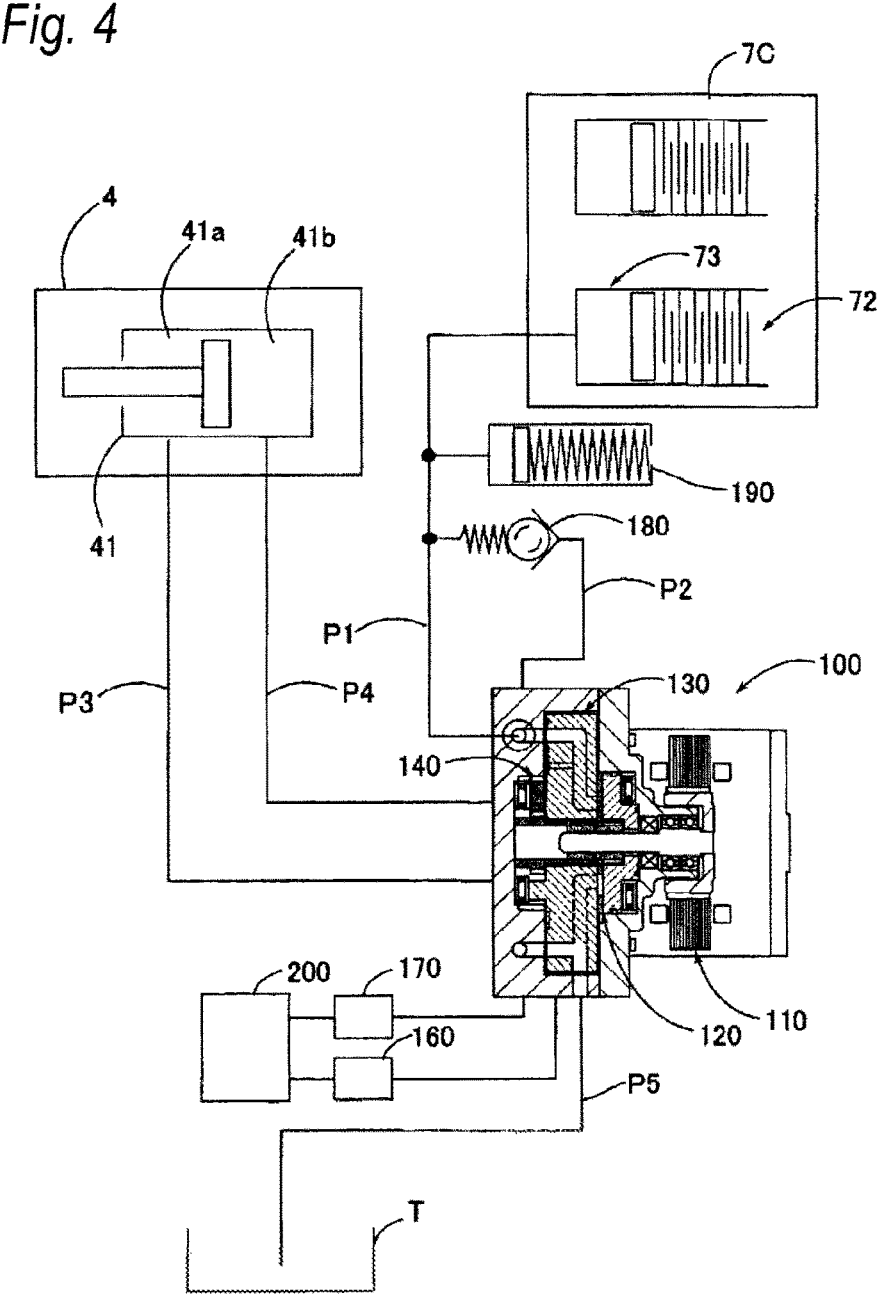
FIG. 4 is a view illustrating a schematic configuration of the driving power transmission device constituted of the center LSD, the pump apparatus with a switching valve that operates a clutch device of the center LSD, and the auxiliary transmission.

As illustrated in FIG. 4, the pump apparatus 100 with a switching valve is configured to include an actuator 110, a rotary pump 120 (equivalent to a "pump" of the invention), a rotary valve 130 (equivalent to a "switching valve" of the invention), a speed change gear 140, a driving power interrupting device 150 for a valve, a driving power interrupting device 151 for a pump, a phase detecting mechanism 160, a pressure detecting mechanism 170, a check valve 180, an accumulator 190, a control device 200, first to fourth flow passages P1 to P4, an oil suction and discharge passage P5, and the like. In addition, machine components of the pump apparatus 100 with a switching valve will be described below in detail.

The cylinder device 73 of the clutch device 7 of the center LSD 7C is pipe-connected to the pump apparatus 100 with a switching valve through the first flow passage P1 and the second flow passage P2. In addition, the first flow passage P1 and the second flow passage P2 are integrated with each other in the middle of the piping. The cylinder device 41 of the auxiliary transmission 4 is pipe-connected to the pump apparatus 100 with a switching valve through the third flow passage P3 and the fourth flow passage P4. Additionally, the pump apparatus 100 with a switching valve is pipe-connected to a reservoir tank T through the oil suction and discharge passage P5.

The first flow passage P1 is, in a normal mode to be described below, a flow passage for supplying the hydraulic oil according to a pressure discharged from the rotary pump 120, to the cylinder device 73 of the clutch device 7, during the rotational driving of the rotary pump 120 and for returning the hydraulic oil within the cylinder device 73 to the pump apparatus 100 with a switching valve during the stop of the rotational driving of the rotary pump 120.

The second flow passage P2 is, in a locking mode to be described below, a flow passage for holding the hydraulic oil discharged from the rotary pump 120 during the rotational driving of the rotary pump 120 and for applying a pressing force to the cylinder device 73 of the clutch device 7 with the held hydraulic oil during the stop of the rotational driving of the rotary pump 120.

The third flow passage P3 is, in an auxiliary transmission switching mode to be described below, a flow passage for supplying the hydraulic oil discharged from the rotary pump 120 to the region 41a of the cylinder device 41 of the auxiliary transmission 4 and for returning the hydraulic oil pushed out from the region 41a of the cylinder device 41 to the pump apparatus 100 with a switching valve when the hydraulic oil is supplied to the region 41b of the cylinder device 41.

The fourth flow passage P4 is, in the auxiliary transmission switching mode, a flow passage for supplying the hydraulic oil discharged from the rotary pump 120 to the region 41b of the cylinder device 41 of the auxiliary transmission 4 and for returning the hydraulic oil pushed out from the region 41b of the cylinder device 41 to the pump apparatus 100 with a switching valve when the hydraulic oil is supplied to the region 41a of the cylinder device 41.

The oil suction and discharge passage P5 is a flow passage for returning the hydraulic oil returned from the cylinder device 73 of the clutch device 7 or the cylinder device 41 of the auxiliary transmission 4 to the reservoir tank T.

(Machine Components of Pump Apparatus with Switching Valve)

Figure 5:
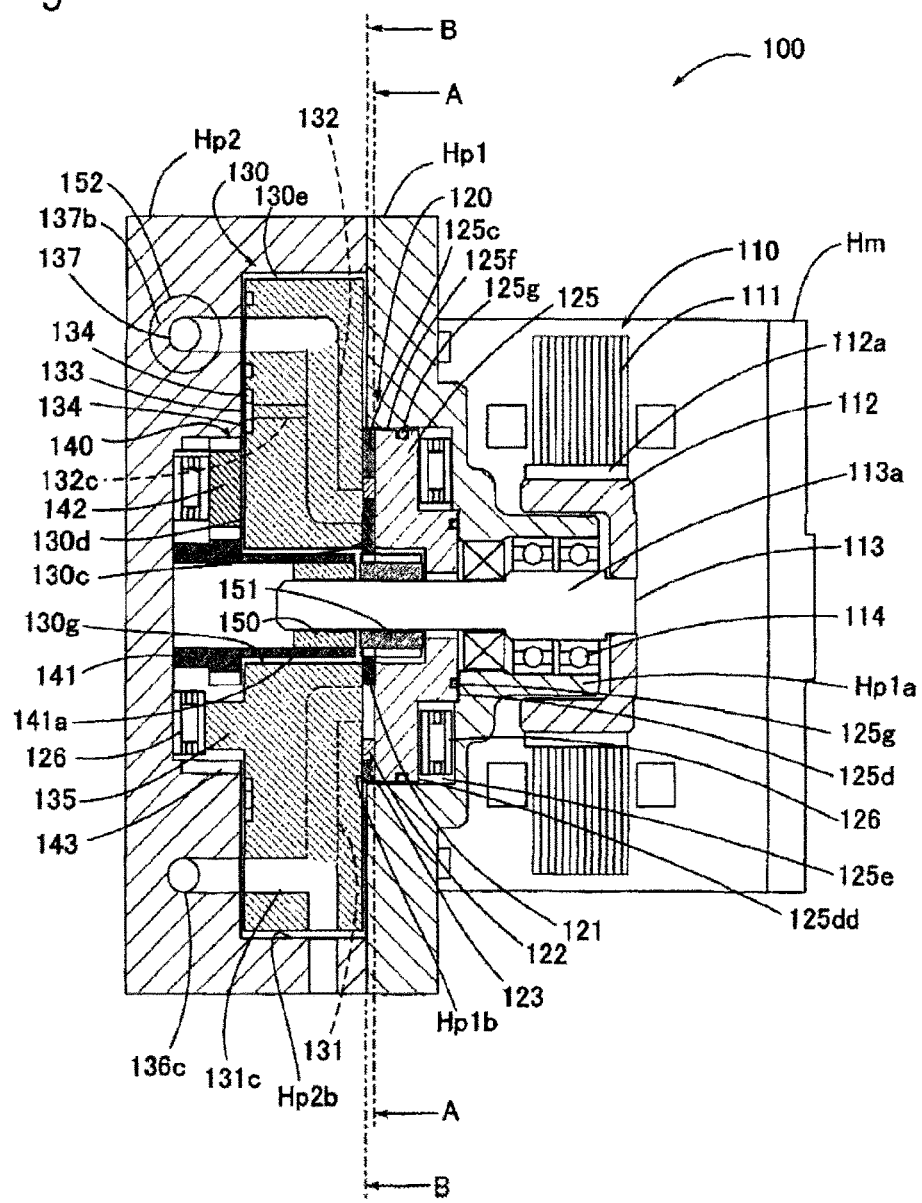
FIG. 5 is a view illustrating an axial cross-section of the pump apparatus with a switching valve.

The machine components of the pump apparatus 100 with a switching valve will be described with reference to the drawings. As illustrated in FIG. 5, the pump apparatus 100 with a switching valve is constituted of a small device in which the machine components, such as the above-described actuator 110, are housed side by side in the direction of the rotational axis in a motor housing Hm, a first pump housing Hp1, and a second pump housing Hp2, which are integrated and have a hollow box shape.

That is, the actuator 110 is housed in the motor housing Hm having a hollow box shape. The rotary pump 120, the rotary valve 130, the speed change gear 140, and the like are housed within a space formed by combining the first pump housing Hp1 and the second pump housing Hp2.

As illustrated in FIG. 5, the actuator 110 is a motor that is rotationally driven, and includes a stator 111, a rotor 112, a rotary shaft 113, and the like.

The stator 111 is constituted of a coil or the like and is fixed to an inner periphery of the motor housing Hm. The rotor 112 is formed in the shape of a basket and has a permanent magnet 112a arranged at an outer periphery thereof, and an end portion of the rotary shaft 113 is fitted to the center of the basket so that the rotary shaft 113 protrudes from the inside of the basket.

The rotor 112 is arranged on an inner peripheral side of the stator 111 so as to be rotatable around an outer peripheral side of the cylindrical portion Hp1a provided to protrude in the direction of the rotational axis from a central portion of the first pump housing Hp1. That is, an outer periphery of a portion 113a of the rotary shaft 113 within the basket is rotatably supported on an inner periphery of the cylindrical portion Hp1a via a radial bearing 114.

Figure 6:
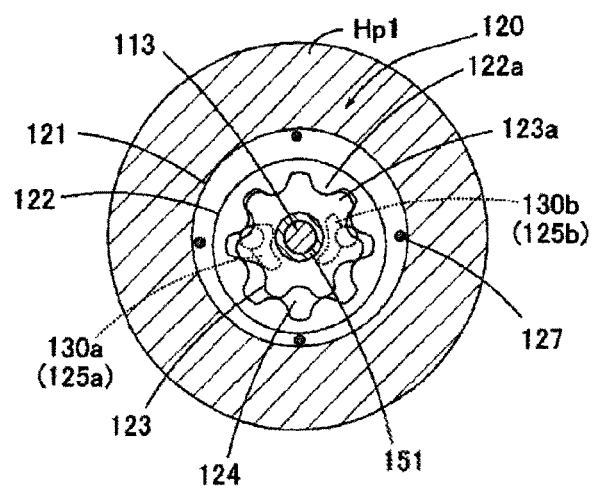
FIG. 6 is a view illustrating a rotary pump and a first pump housing of the pump apparatus with a switching valve as viewed from an arrow A of FIG. 5.

As illustrated in FIGS. 5 and 6, the rotary pump 120 is a pump that discharges sucked hydraulic oil through the rotational driving of the actuator 110 so as to have high pressure, and includes a cam ring 121, an outer rotor 122, an inner rotor 123, and the like.

The cam ring 121 is formed in the shape of a flat ring in which an inner periphery of the cam ring is made eccentric with respect to an outer periphery thereof.

The outer rotor 122 is formed in the shape of a ring having almost the same external diameter and thickness as the internal diameter and thickness of the cam ring 121 and having internal teeth 122a, and is rotatably arranged at an inner periphery of the cam ring 121. The internal teeth 122a are constituted of a plurality of trochoid curves.

The inner rotor 123 is formed in the shape of a ring having almost the same thickness as the thickness of the outer rotor 122 and having external teeth 123a engageable with the internal teeth 122a, and is rotatably arranged at an inner periphery of the outer rotor 122. The external teeth 123a are constituted of a plurality of trochoid curves that are fewer than the number of teeth of the internal teeth 122a. The rotary shaft 113 of the actuator 110 is integrally rotatably fitted to the center of the inner rotor 123 via the driving power interrupting device 151 for a pump.

The rotary pump 120 is sandwiched by a side plate 125 that is rotatably inserted into a bottomed tubular space Hp1b recessed at a central portion of the first pump housing Hp1, and a rotary valve 130 that is rotatably inserted into a bottomed tubular space Hp2b recessed at a central portion of the second pump housing Hp2. Accordingly, the outer rotor 122 and the inner rotor 123 form a pump chamber 124 in a radially facing region, and a plate end surface 125c and a valve end surface 130c of the side plate 125 and the rotary valve 130 in the direction of the rotational axis on the pump chamber 124 side form both side walls of the pump chamber 124.

A step portion 125dd is formed on an outer peripheral side of a plate end surface 125d of the side plate 125 in the direction of the rotational axis on a side opposite to the pump chamber. A back-pressure chamber 125e for causing the hydraulic oil discharged from the pump chamber 124 to flow thereinto and for applying a pressing force to the rotary pump 120 side to the side plate 125 with the pressure of the hydraulic oil is provided between the step portion 125dd and the first pump housing Hp1 facing the step portion 125dd.

Since the fluid has a high pressure during the operation of the rotary pump 120, there is a concern that the fluid may leak if a gap is formed between the rotary pump 120 and the side plate 125, between the rotary pump 120 and the motor housing Hm. and between first pump housing Hp1 and the second pump housing Hp2. However, the positional relationship between the side plate 125 and the motor housing Hm, the first pump housing Hp1, and the second pump housing Hp2 can be maintained by the pressing force generated by the back-pressure chamber 125e, and the leaking of the fluid from the above gap can be prevented.

The side plate 125, the cam ring 121 of the rotary pump 120, and the rotary valve 130 are coupled together by a pin 127. A seal ring 125g is fitted between the plate end surface 125d and a plate peripheral surface 125f of the side plate 125 and the first pump housing Hp1. Also, a pair of thrust bearings 126 are arranged at the first and second pump housing Hp1 and Hp2 so as to sandwich the side plate 125, the rotary pump 120, and the rotary valve 130 in the direction of the rotational axis from both sides. Accordingly, the side plate 125, the rotary pump 120, and the rotary valve 130 become integrally and smoothly rotatable without rattling.

Crescent suction-side grooves 125a and 130a and crescent discharge-side grooves 125b and 130b are formed so as to be respectively recessed at predetermined intervals along a circumferential direction of both the end surfaces 125c and 130c of the pump chamber 124, in both the end surfaces 125c and 130c of the pump chamber 124 in the side plate 125 and the rotary valve 130. Positions where the suction-side grooves 125a and 130a and the discharge-side grooves 125b and 130b are formed are located on a track along which a space formed between the external teeth 123a and the internal teeth 122a moves.

Figure 7:
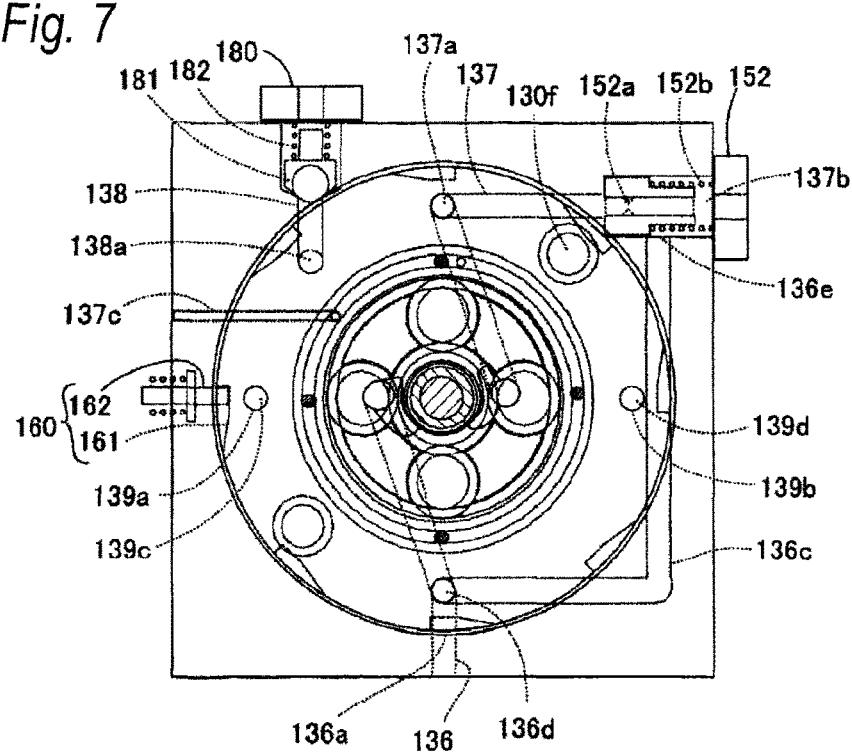
FIG. 7 is a view illustrating a rotary valve, a speed change gear, and a second pump housing of the pump apparatus with a switching valve as viewed from an arrow B of FIG. 5.
Figure 8:
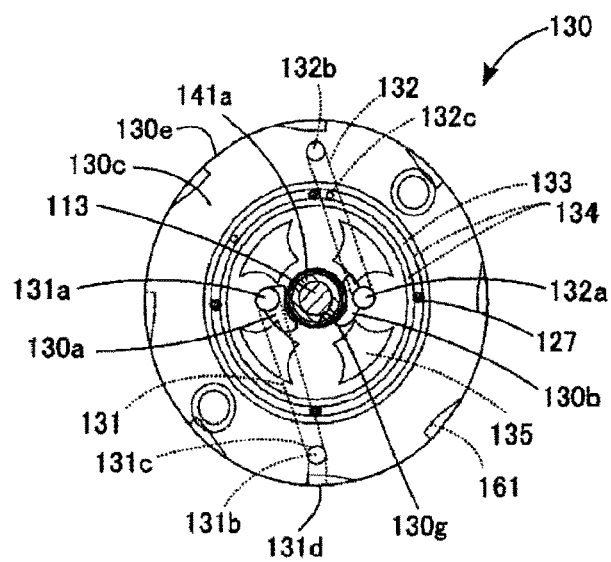
FIG. 8 is a view illustrating only the rotary valve of FIG. 7.

The rotary valve 130 is formed with a suction flow passage 131 that communicates with the pump chamber 124 from a bottom portion of the suction-side groove 130a (refer to FIGS. 5, 7, and 8). A position where the suction flow passage 131 communicates with the bottom portion of the suction-side groove 130a is a starting end of the suction-side groove 130a where the space formed between the external teeth 123a and the internal teeth 122a first passes through the suction-side groove 130a. Additionally, the rotary valve 130 is formed with a discharge flow passage 132 that communicates with the pump chamber 124 from a bottom portion of the discharge-side groove 130b (refer to FIGS. 5, 7, and 8). A position where the discharge flow passage 132 communicates with the bottom portion of the discharge-side groove 130b is an intermediate portion of the discharge-side groove 130b.

In the rotary pump 120, if the actuator 110 is rotationally driven, the inner rotor 123 rotates in the counterclockwise direction of FIG. 6, and the outer rotor 122 meshing with the external teeth 123a through the internal teeth 122a also rotates in the counterclockwise direction of FIG. 6. Then, since the space formed between the external teeth 123a and the internal teeth 122a moves from the suction-side groove 130a to the discharge-side groove 130b and the pressure on the discharge side of the pump chamber 124 becomes higher than the pressure on the suction side of the pump chamber 124, the hydraulic oil is fed from the suction flow passage 131 to the discharge flow passage 132.

The rotary valve 130 is a switching valve that is changed in phase by the rotational driving of the actuator 110 so as to be switchable among a plurality of destinations of the hydraulic oil discharged from the pump chamber 124 and switchable among a plurality of return points made to communicate with the suction side of the pump chamber 124. Accordingly, the fluid can be smoothly returned and reused.

The rotary valve 130 is a switching valve that is switchable among the normal mode where the discharge side of the pump chamber 124 is made to communicate with a first flow passage P1, the locking mode where the discharge side of the pump chamber 124 is made to communicate with the second flow passage P2, and the auxiliary transmission switching mode where the cylinder device 41 is driven by making the discharge side and the suction side of the pump chamber 124 communicate with the third and fourth flow passages P3 and P4, respectively.

As illustrated in FIGS. 5, 7, and 8, a hole 130g through which a cylindrical portion 141a of the sun gear 141 of the speed change gear 140 extending in the direction of the rotational axis is insertable with a gap is drilled at the center of the rotary valve 130.

The above-described suction flow passage 131 and discharge flow passage 132 are formed inside the rotary valve 130. Here, a path of the suction flow passage 131 and the discharge flow passage 132 when the opening 131a within the suction-side groove 130a of the suction flow passage 131 and the opening 132a within the discharge-side groove 130b of the discharge flow passage 132 are located in a left-right direction illustrated in FIG. 8 will be described.

The suction flow passage 131 is a path which extends from the opening 131a within the suction-side groove 130a to a position with almost half the thickness of the rotary valve 130 toward the valve end surface 130d on the opposite side in the direction of the rotational axis, which is bent perpendicularly diagonally in a downward leftward direction at that position and extends to and opens at a valve outer periphery, and which is bent and branched in the direction of the rotational axis before reaching the valve outer periphery 130e and extends to and opens at the valve end surface 130d. The branched flow passage is a flow passage 131c for drain for discharging the hydraulic oil to the reservoir tank T.

That is, the hydraulic oil within the reservoir tank T enters the rotary valve 130 from an opening 131d of the valve outer periphery 130e through the oil suction and discharge passage P5, and is sucked from the opening 131a through the suction flow passage 131 to the pump chamber 124. Additionally, the hydraulic oil from the cylinder device 73 passes through the suction flow passage 131 extending from the flow passage 131c for drain to the valve outer periphery 130e through the first flow passage P1, and is discharged from the opening 131d of the valve outer periphery 130e through the oil suction and discharge passage P5 to the reservoir tank T.

The discharge flow passage 132 is a path which extends from the opening 132a within the discharge-side groove 130b to the position with almost half the thickness of the rotary valve 130 toward the valve end surface 130d on the opposite side in the direction of the rotational axis, which is bent perpendicularly diagonally in an upward leftward direction at that position and is bent in the direction of the rotational axis before reaching the valve outer periphery 130e, and which extends to and opens at the valve end surface 130d. That is, an opening 131b of the valve end surface 130d of the flow passage 131c for drain and an opening 132b of the valve end surface 130d of the discharge flow passage 132 are drilled at positions (positions separated by 180 degrees from each other in the circumferential direction) that are point-symmetrical to each other with respect to the center of the rotary valve 130.

The valve end surface 130d of the rotary valve 130 is provided with a circumferential groove 133 that allows the hydraulic oil discharged from the pump chamber 124 to flow thereinto. The circumferential groove 133 is provided in order to detect the pressure of each of a plurality of destinations of the hydraulic oil discharged from the pump chamber 124, using the pressure detecting mechanism 170 communicating therewith. For this reason, the circumferential groove 133 communicates with a flow passage 132c for pressure detection branched from the middle of the discharge flow passage 132.

A seal ring 134 is fitted outside and inside the circumferential groove 133 in order to prevent the leaking of the hydraulic oil from the circumferential groove 133. By forming such an annular groove, the pressure of each of all the destinations can be detected by one pressure detecting mechanism 170 even if the rotary valve 130 rotates. In addition, as the pressure detecting mechanism 170, there is a pressure detecting sensor using electric capacity, strain, or the like.

Moreover, four protrusions 135 that are inserted into respective gaps of four planetary gears 142 of the speed change gear 140 and rotate coaxially with the speed change gear 140 are provided so as to protrude at equal angular intervals from the valve end surface 130d of the rotary valve 130.

Recesses 161 that constitute the phase detecting mechanism 160 and have a wedge-shaped radial cross-section are provided at intervals of 45 degrees at the valve outer periphery 130e of the rotary valve 130. The recesses 161 are provided in order to detect and position the rotational phase of the rotary valve 130, in cooperation with the phase detecting sensor 162 that constitutes the phase detecting mechanism 160. Namely, the recesses 161 and the phase detecting sensor 162 function as a braking device that is switchable between a state where the rotation of the rotary valve 130 with respect to the first housing Hp1 is restrained for the rotational phase detection and positioning of the rotary valve 130 and a state where the rotary valve 130 is released with respect to the first housing Hp1 for the switching of the flow passage 131 or the like of the rotary valve 130.

By inserting the phase detecting sensor 162 into such a triangular columnar recess, the phase detecting sensor 162 abuts against the wall of a recess 161 when the rotary valve 130 tends to rotate in the counterclockwise direction of the drawing. Thus, counterclockwise rotation can be prevented, and the rotational phase of the rotary valve 130 can be detected and positioned. Accordingly, a plurality of destinations of the fluid discharged from the pump chamber 124 can be reliably switched.

Figure 9:
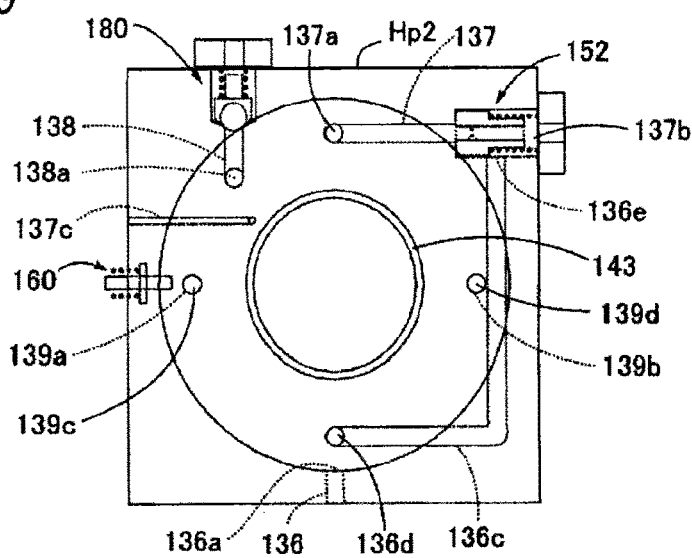
FIG. 9 is a view illustrating only the second pump housing of FIG. 7.

As illustrated in FIGS. 5, 7, and 9, the second pump housing Hp2 is provided with a communication suction flow passage 136 capable of communicating with the suction flow passage 131 provided in the rotary valve 130, and is provided with a flow passage 136c for communication drain, a first suction and discharge flow passage 139a, and a second suction and discharge flow passage 139b capable of communicating with the flow passage 131c for drain. Additionally, a normal discharge flow passage 137 and a locking discharge flow passage 138 capable of communicating with the discharge flow passage 132 is provided. In addition, the first suction and discharge flow passage 139a and the second suction and discharge flow passage 139b are also capable of communicating with the discharge flow passage 132. Moreover, a flow passage 137c (equivalent to a "communication hole" of the invention) for communication pressure detection that always communicates with the flow passage 132c for pressure detection is provided.

An opening 136a of the communication suction flow passage 136 that coincides with the opening 131d of the valve outer periphery 130e of the suction flow passage 131 when a rotary valve 130 is rotated and positioned in a predetermined phase is provided in an inner periphery of a space Hp2b of the second pump housing Hp2. Moreover, a bottom portion of the space Hp2b of the second pump housing Hp2 is provided with an opening 136d of the flow passage 136c for communication drain that coincides with the opening 131b of the valve end surface 130d of the flow passage 131c for drain and an opening 137a of the communication discharge flow passage 137 that coincides with the opening 132b of the valve end surface 130d of the discharge flow passage 132, when the above phase positioning is performed.

Namely, the positional relationship between the opening 136d of the flow passage 136c for communication drain and the opening 137a of the normal discharge flow passage 137 is the same as the positional relationship between the opening 131b of the flow passage 131c for drain and the opening 132b of the discharge flow passage 132, and these openings are drilled at upper and lower positions separated by 180 degrees from each other in the circumferential direction in the bottom portion of the space Hp2b. When the openings 136d and 131b coincide with each other and the openings 137a and 132b coincide with each other, the phase detecting sensor 162 is inserted into a predetermined recess 161 to detect and position a rotational phase.

Moreover, the bottom portion of the space Hp2b of the second pump housing Hp2 is provided with an opening 139c of the first suction and discharge flow passage 139a and an opening 139d of the second suction and discharge flow passage 139b that coincide with the opening 131b of the valve end surface 130d of the flow passage 131c for drain and the opening 132b of the valve end surface 130d of the discharge flow passage 132, when the rotary valve 130 has been rotated by 90 degrees in the clockwise direction or in the counterclockwise direction of the drawing from a state where the openings 136d and 131 b coincide with each other and the openings 137a and 132b coincide with each other.

Namely, the positional relationship between the opening 139c of the first suction and discharge flow passage 139a and the opening 139d of the second suction and discharge flow passage 139b is the same as the positional relationship between the opening 131b of the flow passage 131c for drain and the opening 132b of the discharge flow passage 132, and these openings are drilled in left and right positions (positions shifted by 90 degrees in the circumferential direction with respect to the positional relationship between the opening 136d for communication drain of the flow passage 136c and the opening 137a of the normal discharge flow passage 137) separated by 180 degrees from each other in the circumferential direction in the bottom portion of the space Hp2b. When the openings 139c and 131 b coincide with each other and the openings 139*d* and 132*b* coincide with each other, the phase detecting sensor 162 is inserted into a recess 161 to detect and position a rotational phase.

Moreover, the bottom portion of the space Hp2*b* of second pump housing Hp2 is provided with an opening 138*a* of the locking discharge flow passage 138 that coincides with the opening 132*b* of the valve end surface 130*d* of the discharge flow passage 132 when the rotary valve 130 has been rotated by 45 degrees in the counterclockwise direction of the drawing from a state where the openings 136*d* and 131 *b* coincide with each other and the openings 137*a* and 132*b* coincide with each other. In this case, the opening 136*d* of the flow passage 136*c* for communication drain and the opening 137*a* of the normal discharge flow passage 137 are closed with a lid 130*f* provided in the valve end surface 130*d*.

Additionally, the bottom portion of the space Hp2*b* of the second pump housing Hp2 is provided with an opening 137*d* of the flow passage 137*c* for communication pressure detection that always coincides with the circumferential groove 133 of the rotary valve 130.

Next, a path of the communication suction flow passage 136, the flow passage 136*c* for communication drain, the normal discharge flow passage 137, the locking discharge flow passage 138, the first suction and discharge flow passage 139*a*, the second suction and discharge flow passage 139*b*, and the flow passage 137*c* for communication pressure detection will be described.

The communication suction flow passage 136 is a path that extends and opens at a bottom surface of the second pump housing Hp2 radially downward from the opening 136*a* of the inner periphery of the space Hp2*b* of the second pump housing Hp2.

The flow passage 136*c* for communication drain is a path which extends from the opening 136*d* of the bottom portion of the space Hp2*b* of the second pump housing Hp2 to the position with almost half the thickness of the second pump housing Hp2 toward a housing end surface opposite to a housing end surface in which the space Hp2*b* is provided in the direction of the rotational axis, which is bent perpendicularly rightward at that position and bent perpendicularly upward before reaching a housing side surface, and which communicates with a valve hole 137*b* provided in the normal discharge flow passage 137. A port that communicates with the valve hole 137*b* of the flow passage 136*c* for communication drain is a drain port 136*e*.

The normal discharge flow passage 137 is a path which extends from the opening 137*a* of the bottom portion of the space Hp2*b* of the second pump housing Hp2 to the position with almost half the thickness of the second pump housing Hp2 toward the housing end surface opposite to the housing end surface in which the space Hp2*b* is provided in the direction of the rotational axis, and which leads to the valve hole 137*b* bent perpendicularly rightward at that position and formed at the housing side surface. The valve hole 137*b* includes a flow control valve 152 connected to the first flow passage P1.

The flow control valve 152 is provided with a throttle 152*a* that makes the pressure of the hydraulic oil on the clutch device 7 side (first flow passage P1 side) of the flow control valve 152 greater than the pressure of the hydraulic oil on the rotary valve 130 side (the normal discharge flow passage 137 side) in a state where the hydraulic oil is supplied.

The flow control valve 152 is biased to the normal discharge flow passage 137 side by the restoring force of a compression spring 152*b* (equivalent to a "biasing member" of the invention) within the valve hole 137*b* when the rotary valve 130 is in the normal mode and the rotary pump 120 is stopped. Additionally, the flow control valve 152 is moved to a position where the drain port 136*e* is closed against the restoring force of the compression spring 152*b*, by the pressure difference of the hydraulic oil when the rotary valve 130 is in the normal mode and the rotary pump 120 is driven.

That is, the flow control valve 152 is a valve that is switchable between a state where the hydraulic oil is supplied from the discharge side of the rotary pump 120 to the clutch device 7 side by closing the drain port 136*e* and a state where the hydraulic oil is discharged from the clutch device 7 side to the suction side of the rotary pump 120 by opening the drain port 136*e*. Accordingly, the fluid can be smoothly supplied to a switching place, the pressure of the fluid can be rapidly lowered from the switching place, and the driving power transmission device can be actuated at a high speed.

The locking discharge flow passage 138 is a path which extends from the opening 138*a* of the bottom portion of the space Hp2*b* of the second pump housing Hp2 to the position with almost half the thickness of the second pump housing Hp2 toward the housing end surface opposite to the housing end surface in which the space Hp2*b* is provided in the direction of the rotational axis, which is bent perpendicularly upward, and which leads to a check valve 180 connected to the second flow passage P2 provided in a housing upper surface.

The check valve 180 is a valve that always presses a valve body 181 against a discharge port of the locking discharge flow passage 138 through the action of a compression spring 182, regulates a back flow of the hydraulic oil to the rotary pump 120 side during the stop of the rotary pump 120, and permits the supply of the hydraulic oil to the clutch device 7 side during the driving of the rotary pump 120. Accordingly, the leaking of the fluid can be suppressed in the locking mode, and the pressure of the fluid can be maintained for a prolonged period of time.

The first suction and discharge flow passage 139*a* and the second suction and discharge flow passage 139*b* are a path that extends to and opens at the housing end surface opposite to the housing end surface in which the space Hp2*b* is provided in the direction of the rotational axis from the openings 139*c* and 139*d* of the bottom portion of the space Hp2*b* of the second pump housing Hp2.

The flow passage 137*c* for communication pressure detection is a path which extends from the opening 137*d* of the bottom portion of the space Hp2*b* of the second pump housing Hp2 to the position with almost half the thickness of the second pump housing Hp2 toward the housing end surface opposite to the housing end surface in which the space Hp2*b* is provided in the direction of the rotational axis, and which is bent perpendicularly leftward at that position and extends to and opens at the housing side surface.

Figure 10:
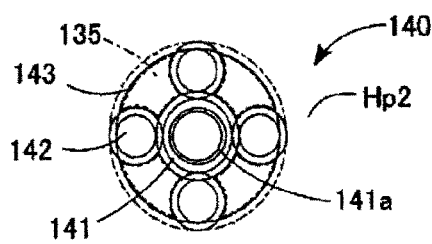
FIG. 10 is a view illustrating only the speed change gear of FIG. 7.

As illustrated in FIGS. 5, 7, and 10, the speed change gear 140 is a reduction gear that makes a reduction ratio when the rotational driving power of the actuator 110 is transmitted to the rotary pump 120 greater than the reduction ratio when the rotational driving power is transmitted to the rotary valve 130. The speed change gear 140 is rotatably fitted into a bottomed tubular space Hp2*c* recessed further toward a back side than the bottomed tubular space Hp2*b* recessed at a central portion of the second pump housing Hp2 into which the rotary valve 130 is inserted.

The speed change gear 140 includes the sun gear 141, the four planetary gears 142, and an internal gear 143.

The sun gear 141 is formed with a cylindrical portion 141*a* extending in the direction of the rotational axis. Also, the rotary shaft 113 of the actuator 110 is integrally rotatably fitted to an inner periphery of the cylindrical portion 141a via the driving power interrupting device 150 for a valve.

The four planetary gears 142 are meshed with the sun gear 141 at equal angular intervals. Also, the protrusions 135 of the rotary valve 130 are inserted between the planetary gears 142 so that the rotary valve 130 is rotatable with the revolution of the planetary gears 142 around the sun gear 141.

The internal gear 143 is integrally provided at an inner periphery of the space Hp2c of the second pump housing Hp2. The four planetary gears 142 are meshed with the internal gear 143 at equal angular intervals. In addition, the internal gear 143 may be provided separately from the second pump housing Hp2 and may be pin-coupled to the second pump housing Hp2.

The driving power interrupting device 150 for a valve is a one-way clutch that is switchable between a state where clockwise rotational driving power, illustrated in the drawing, of the actuator 110 is transmitted to the rotary valve 130 and a state where counterclockwise rotational driving power is interrupted. The driving power interrupting device 151 for a pump is a one-way clutch that is switchable between a state where counterclockwise rotational driving power, illustrated in the drawing, of the actuator 110 is transmitted to the rotary pump 120 and a state where clockwise rotational driving power is interrupted.

Accordingly, the rotary pump 120 and the rotary valve 130 can be reliably switched and rotationally driven. Also, the fluid can be reliably supplied to a predetermined destination without simultaneously actuating the rotational driving of the rotary pump 120 and the rotational driving of the rotary valve 130. In addition, it is also possible to use a frictional plate type clutch instead of the one-way clutch.

As illustrated in FIG. 7, the phase detecting mechanism 160 is constituted of the recesses 161 having a wedge-shaped radial cross-section, and the phase detecting sensor 162. The recesses 161 are provided at intervals of 45 degrees in the valve outer periphery 130e of the rotary valve 130. The phase detecting sensor 162 is a sensor using an eddy current, magnetism, or the like, is provided so that a sensor portion is fixed to a side surface of the second pump housing Hp2 and a tip portion makes the amount of protrusion from an inner peripheral surface of the second pump housing Hp2 to a radial inner side variable by means of a spring 163.

Since a high pressure is applied to the rotary valve 130 during the operation of the rotary pump 120, there is a concern that the rotary valve 130 may idle with only the driving power interrupting device 150 for a valve. However, since the recesses 161 to be locked in the circumferential direction to the phase detecting sensor 162 are provided, the idling of the rotary valve 130 can be prevented.

As illustrated in FIG. 7, the check valve 180 is constituted of the valve body 181 and the compression spring 182. The valve body 181 is always pressed against the discharge port of the locking discharge flow passage 138 by the spring force of the compression spring 182 during the stop of the rotary pump 120. Accordingly, a back flow of the hydraulic oil to the locking discharge flow passage 138 can be regulated.

Additionally, during the driving of the rotary pump 120, the valve body 181 is separated from the discharge port of the locking discharge flow passage 138 against the spring force of the compression spring 182 by the hydraulic oil discharged from the locking discharge flow passage 138. Accordingly, the supply of the hydraulic oil to the clutch device 7 side is permissible.

As illustrated in FIG. 4, the accumulator 190 is a pressure accumulation device that is connected to the second flow passage P2, accumulates, when the pressure of hydraulic oil within the second flow passage P2 is equal to or higher than a predetermined pressure, the hydraulic oil, and discharges the hydraulic oil accumulated in the second flow passage P2 during the stop of the rotary pump 120 when the pressure of the hydraulic oil within the second flow passage P2 is reduced. Accordingly, the pressure of the fluid can be maintained for a prolonged period of time. Hence, the driving of the rotary pump 120 can be stopped for a long time, and the current consumption of the driving power transmission device can be suppressed.

As illustrated in FIG. 4, the control device 200 has a function of, according to the normal mode, the locking mode, and the auxiliary transmission switching mode, controlling the rotational driving of the actuator 110 on the basis of the phase of the rotary valve 130 detected by the phase detecting mechanism 160 and controlling the rotational driving of the actuator 110 on the basis of the pressure of the hydraulic oil detected by the pressure detecting mechanism 170. Accordingly, the driving of the actuator can be exactly controlled so that the destination of the fluid becomes accurate. Additionally, the driving of the actuator can be exactly controlled so that the pressure of the fluid becomes proper.

(Operation of Pump Apparatus with Switching Valve)

Next, the respective operations of the normal mode, the locking mode, and the auxiliary transmission switching mode of the pump apparatus 100 with a switching valve will be described with reference to the drawings.

Figure 11A:
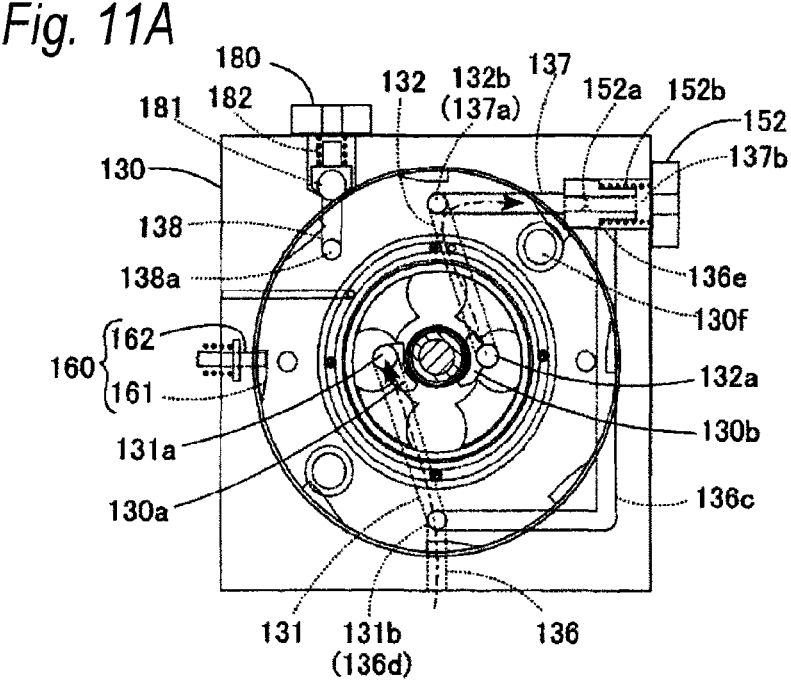
FIG. 11A is a view illustrating the state of a flow passage in a normal mode of the pump apparatus with a switching valve.

In FIGS. 11A to 13B, a flowing direction of the hydraulic oil is shown as an arrow. In the normal mode, as illustrated in FIG. 11A, the opening 131d of the suction flow passage 131 of the rotary valve 130 coincides with the opening 136a of the communication suction flow passage 136, and the opening 131b of the flow passage 131c for drain coincides with the opening 136d of the flow passage 136c for communication drain. Additionally, the opening 132b of the discharge flow passage 132 of the rotary valve 130 coincides with the opening 137a of the normal discharge flow passage 137.

If the rotary pump 120 is rotationally driven in this state, the hydraulic oil within the reserve tank T is sucked from the communication suction flow passage 136 through the suction flow passage 131 into the pump chamber 124. The hydraulic oil made to have a high pressure within the pump chamber 124 is discharged from the discharge flow passage 132 through the normal discharge flow passage 137 to the flow control valve 152.

Figure 11B:
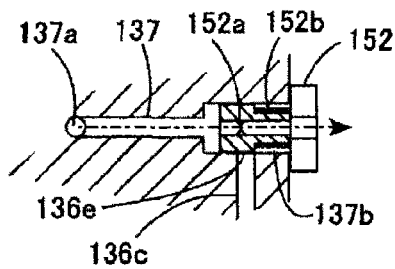
FIG. 11C is a view illustrating the state of the flow control valve when hydraulic oil is discharged in the normal mode of the pump apparatus with a switching valve.

Then, as illustrated in FIG. 11B, the flow control valve 152 is moved to a position where the drain port 136e is closed, by a pressure difference caused as the hydraulic oil passes through the throttle 152a of the flow control valve 152. The hydraulic oil that has passed through the flow control valve 152 is supplied to the cylinder device 73 of the clutch device 7 through the first flow passage P1, and makes the multiple disc clutch 72 engaged with a predetermined pressure according to a pressure detection signal of the pressure detecting mechanism 170. Thereafter, the rotational driving of the rotary pump 120 is controlled according to the pressure detection signal of the pressure detecting mechanism 170 so that the multiple disc clutch 72 is engaged with a predetermined pressure.

Figure 11C:
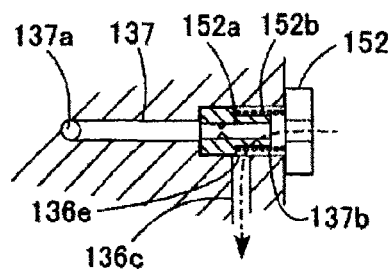

If the rotational driving of the rotary pump 120 is stopped as illustrated in FIG. 11C, the pressure difference within the flow control valve 152 is eliminated. Thus, the flow control valve 152 is moved to a position where the drain port 136e is opened, by the restoring force of the compression spring 152b. The hydraulic oil within the cylinder device 73 of the clutch device 7 is returned from the first flow passage P1 through the drain port 136e and the flow passage 131c for drain to the reserve tank T. The normal mode is completed through the above.

Figure 12A:
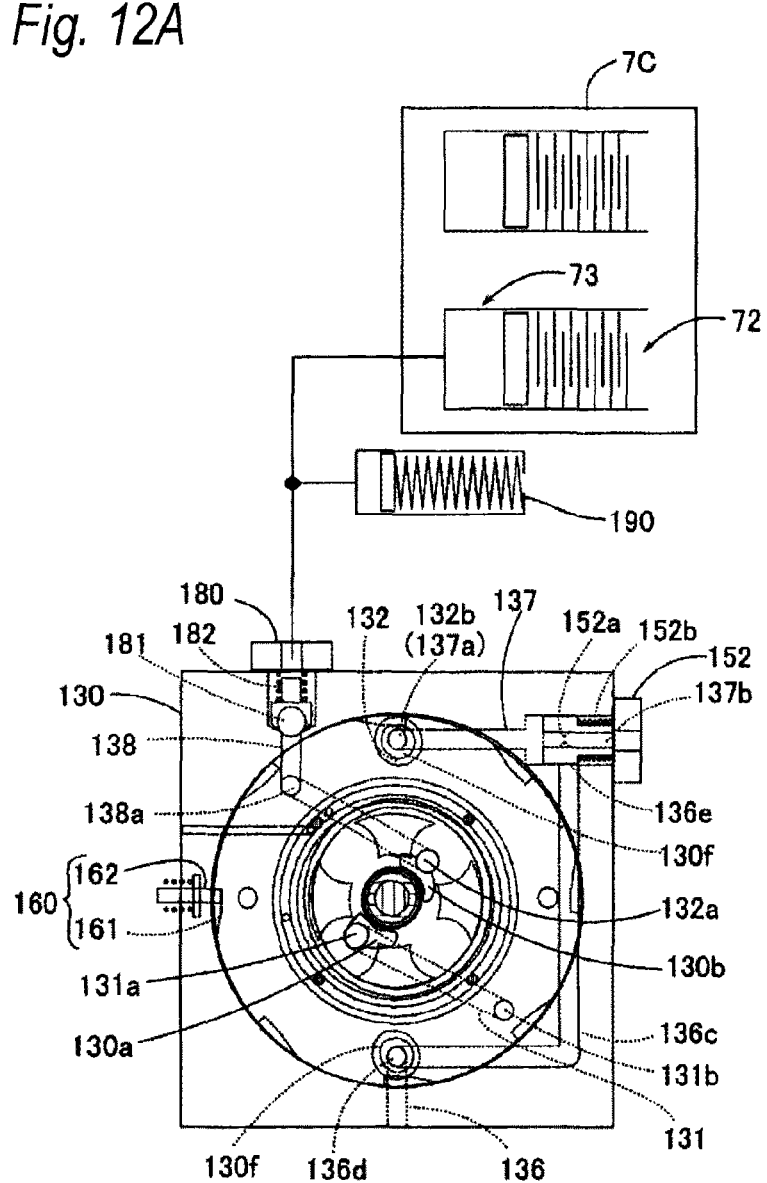
FIG. 12A is a view illustrating the state of the flow passage in a locking mode of the pump apparatus with a switching valve.

In the locking mode, as illustrated in FIG. 12A, the opening 131b of the flow passage 131c for drain of the rotary valve 130 is closed by the lid 130f. Additionally, the opening 132b of the discharge flow passage 132 of the rotary valve 130 coincides with the opening 138a of the locking discharge flow passage 138.

In this state, since the first flow passage P1 side, the normal discharge flow passage 137, and the drain port 136e side of the flow control valve 152 are all closed, a state where the hydraulic pressure that is present in the flow control valve 152 is equal to the hydraulic pressure of the cylinder device 73 of the clutch device 7 and the hydraulic pressure of the accumulator 190 is brought about.

Figure 12B:
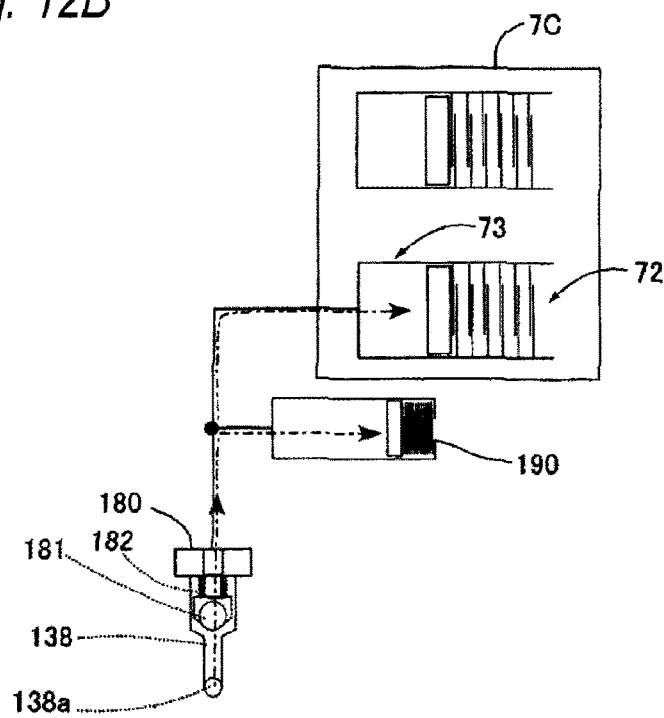
FIG. 12B is a view illustrating the states of a check valve, an accumulator, and a cylinder device when hydraulic oil is supplied in the locking mode of the pump apparatus with a switching valve.

If the rotary pump 120 is rotationally driven in this state, as illustrated in FIG. 12B, the hydraulic oil within the reserve tank T is sucked from the communication suction flow passage 136 through the suction flow passage 131 into the pump chamber 124. The hydraulic oil made to have a high pressure within the pump chamber 124 opens the check valve 180 through the locking discharge flow passage 138 from the discharge flow passage 132.

Then, the hydraulic oil that has passed through the check valve 180 is supplied to the cylinder device 73 of the clutch device 7 through the second flow passage P2, and makes the multiple disc clutch 72 engaged with a predetermined pressure according to the pressure detection signal of the pressure detecting mechanism 170. If the multiple disc clutch 72 is engaged with a predetermined pressure, the hydraulic oil that has passed through the check valve 180 is supplied to the accumulator 190. If the pressure of the accumulator 190 reaches a predetermined pressure according to the pressure detection signal of the pressure detecting mechanism 170, the rotational driving of the rotary pump 120 is stopped.

Figure 12C:
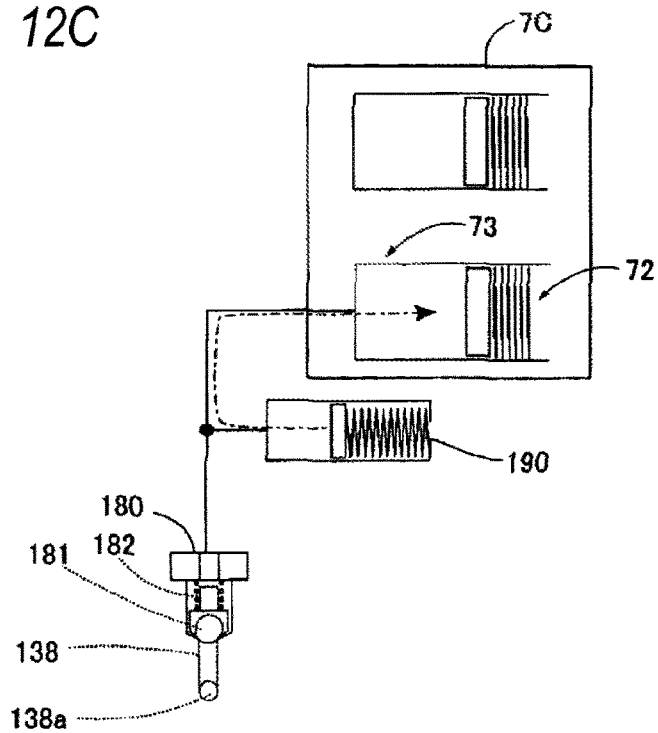
FIG. 12C is a view illustrating the states of the check valve, the accumulator, and the cylinder device when supply of the hydraulic oil is stopped in the locking mode of the pump apparatus with a switching valve.

If the supply of the hydraulic oil passing through the locking discharge flow passage 138 from the discharge flow passage 132 is stopped as illustrated in FIG. 12C, the check valve 180 is closed by the restoring force of the compression spring 182. Then, when the pressure of the multiple disc clutch 72 is lowered, the hydraulic oil is supplied from the accumulator 190, and the multiple disc clutch 72 is engaged with a predetermined pressure. Then, if the pressure of the accumulator 190 is lowered, the rotary pump 120 is rotationally driven again, and the above-described operation is repeated until the locking mode is completed.

Figure 13A:
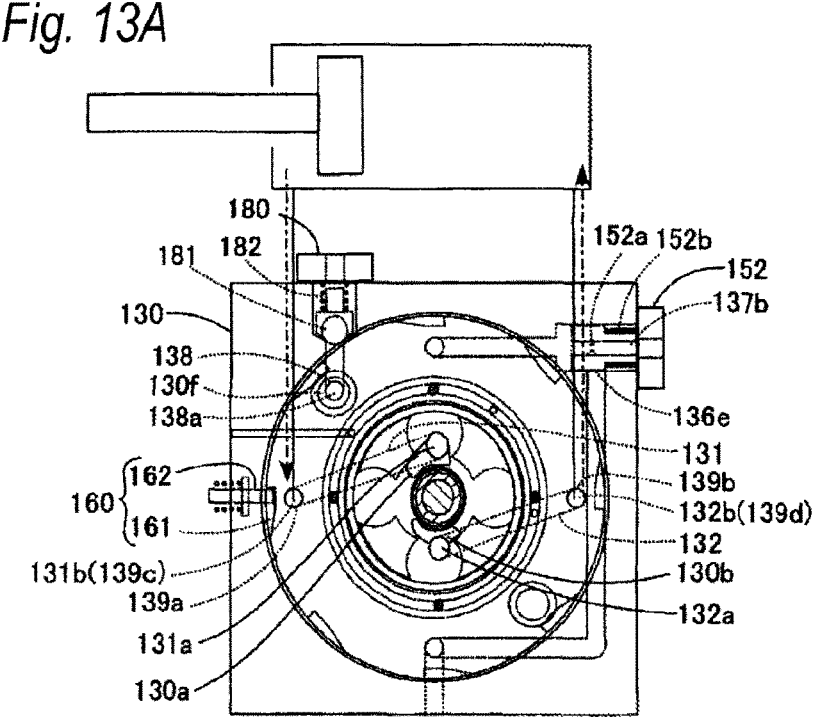
FIG. 13A is a view illustrating the states of the flow passage and the cylinder device in an auxiliary transmission switching mode (to) of the pump apparatus with a switching valve.

In the auxiliary transmission switching mode (Hi), as illustrated in FIG. 13A, the opening 132b of the discharge flow passage 132 of the rotary valve 130 coincides with the opening 139d of the second suction and discharge flow passage 139b, and the opening 131b of the flow passage 131c for drain coincides with the opening 139c of the first suction and discharge flow passage 139a. Additionally, the opening 131d of the suction flow passage 131 of the rotary valve 130 is closed.

If the rotary pump 120 is rotationally driven in this state, the hydraulic oil within the region 41a of the cylinder device 4 is sucked from the third flow passage P3 through the first suction and discharge flow passage 139a and the flow passage 131c for drain into the pump chamber 124. Then, the hydraulic oil within the pump chamber 124 is supplied from the discharge flow passage 132 through the second suction and discharge flow passage 139b and the fourth flow passage P4 to the region 41b of the cylinder device 4 of the auxiliary transmission 4, moves the piston 42 to the region 41a side, and performs switching to a speed change Hi. The auxiliary transmission switching mode (Hi) is completed through the above.

Figure 13B:
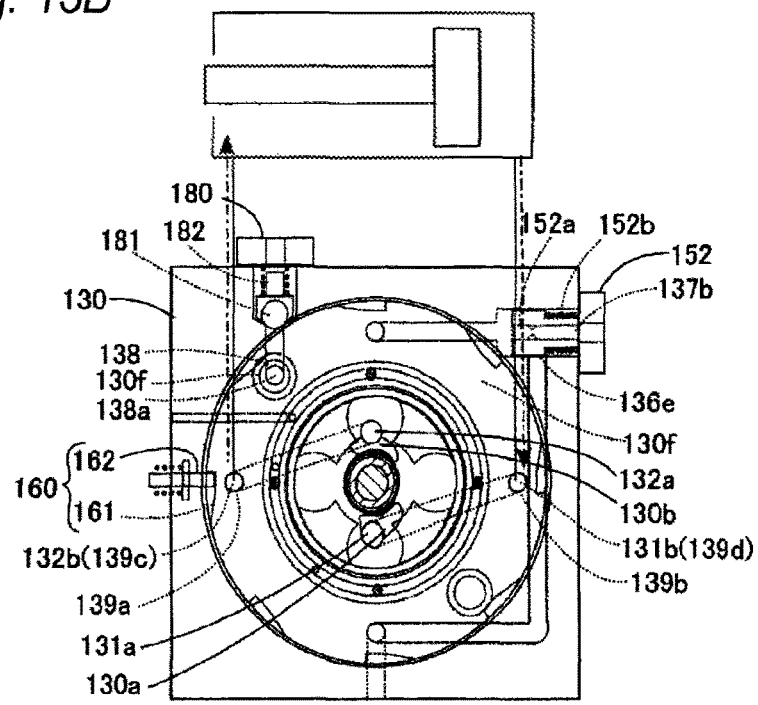
FIG. 13B is a view illustrating the states of the flow passage and the cylinder device in an auxiliary transmission switching mode (Hi) of the pump apparatus with a switching valve.

In the auxiliary transmission switching mode (Lo), as illustrated in FIG. 13B, the opening 132b of the discharge flow passage 132 of the rotary valve 130 coincides with the opening 139c of the first suction and discharge flow passage 139a, and the opening 131b of the flow passage 131c for drain coincides with the opening 139d of the second suction and discharge flow passage 139b. Additionally, the opening 131d of the suction flow passage 131 of the rotary valve 130 is closed.

If the rotary pump 120 is rotationally driven in this state, the hydraulic oil within the region 41b of the cylinder device 4 is sucked from the fourth flow passage P4 through the second suction and discharge flow passage 139b and the flow passage 131c for drain into the pump chamber 124. Then, the hydraulic oil within the pump chamber 124 is supplied from the discharge flow passage 132 through the first suction and discharge flow passage 139a and the third flow passage P3 to the region 41a of the cylinder device 4 of the auxiliary transmission 4, moves the piston 42 to the region 41b side, and performs switching to a speed change Lo. The auxiliary transmission switching mode (Lo) is completed through the above.

According to the pump apparatus with a switching valve of the present embodiment, the rotational driving of the rotary pump 120 and the rotational driving of the rotary valve 130 can be performed by one actuator 110 by performing switching using the driving power interrupting device 150 for a valve. Thus, the drive control of one actuator 110 becomes simple, and the high-speed operation of the pump apparatus 100 with a switching valve is possible. Additionally, since the number of devices can be reduced, remarkable cost reduction can be achieved.

According to the driving power transmission device of the present embodiment, the normal mode and the locking mode are switched by the rotary valve 130. Thus, the pressure of the fluid can be maintained even if the driving of the rotary pump 120 is stopped in the locking mode. Accordingly, the current consumption of the driving power transmission device can be suppressed.

According to the pump apparatus with a switching valve of the present embodiment, the reduction ratio when the rotational driving power of the actuator 110 is transmitted to the rotary pump 120 is greater than the reduction ratio when the rotational driving power is transmitted to the rotary valve 130. Thus, the rotational driving of the rotary pump 120 and the rotary valve 130 can be performed, respectively, by one actuator 110. Hence, the pump apparatus 100 with a switching valve can be simply controlled, and an improvement in pump efficiency and an improvement in valve positioning accuracy can be made compatible.

(Others)

In addition, in the above-described embodiment, the cam ring 121 of the rotary pump 120 is separately provided. However, the shape of the cam ring 121 may be provided at the side plate 125. Accordingly, the leaking of oil between the rotary pump 120 and the rotary valve 130 can be reduced, and integral rotation of the side plate 125 and the rotary valve 130 can be more smoothly performed.

Additionally, in the above-described embodiment, the actuator 110, the rotary pump 120, the rotary valve 130, and the speed change gear 140 are integrated. However, a configuration may be adopted in which the rotary pump 120 is directly connected to the actuator 110, and the actuator 110 and the rotary valve 130 are coupled together via a gear mechanism (speed change gear 140), a belt pulley mechanism, or the like.

Additionally, although the above-described embodiment provides a configuration in which the rotational phase of the rotary valve 130 is detected by the phase detecting mechanism 160, a configuration may be adopted in which the actuator 110 includes a rotary encoder or the rotational phase is detected using a stepping motor as the actuator 110. Additionally, although the pressure of the hydraulic oil within the rotary valve 130 is detected by the pressure detecting mechanism 170, a configuration may be adopted in which the pressure of the hydraulic oil is detected by the driving current of the actuator 110.

Additionally, although the above-described embodiment provides a configuration in which the rotary valve 130 is rotated using a reduction gear as the speed change gear 140, a configuration may be adopted in which the rotary pump 120 is rotated using a speed increasing gear as the speed change gear 140. Accordingly, since the speed change gear 140 can be simply configured, cost reduction of the pump apparatus 100 with a switching valve can be achieved. Additionally, a configuration may be adopted in which the rotary pump 120 is rotated using a first reduction gear as the speed change gear 140 and the rotary valve 130 is rotated using a second reduction gear with a greater reduction ratio than the first reduction gear. Accordingly, the pumping pressure of the rotary pump 120 can be increased.

What is claimed is:

1. A driving power transmission device comprising:
   a fluid pressure type clutch device that transmits driving power between two shaft members; and
   a pump apparatus that supplies a fluid to the clutch device, wherein the pump apparatus includes:
   a pump that makes a pressure of sucked fluid high to discharge the fluid with a high-pressure;
   a first flow passage through which the fluid according to a pressure discharged from the pump is supplied to the clutch device during a driving of the pump;
   a second flow passage through which the fluid discharged from the pump is held during a stop of the pump and a pressing force is applied to the clutch device by the fluid to be held; and
   a switching valve that is switchable between a normal mode where a discharge port of the pump is made to communicate with the first flow passage and a locking mode where the discharge port of the pump is made to communicate with the second flow passage.

2. The driving power transmission device according to claim 1, wherein
   the second flow passage is provided with a check valve that regulates a back flow of the fluid to the pump side during the stop of the pump and permits the supply of the fluid to the clutch device side during the driving of the pump.

3. The driving power transmission device according to claim 2, further comprising:
   a pressure accumulation device that accumulates the fluid when the pressure of the fluid within the second flow passage is equal to or higher than a predetermined pressure and that discharges the accumulated fluid to the second flow passage during the stop of the pump when the pressure of the fluid within the second flow passage is reduced.

4. The driving power transmission device according to claim 1, further comprising
   an actuator that is rotationally driven,
   wherein the switching valve is a rotary valve that is changed in phase by the rotational driving of the actuator so as to be switchable between the normal mode and the locking mode.

5. The driving power transmission device according to claim 4, wherein
   the pump is a rotary pump that includes an outer rotor and an inner rotor that form a pump chamber in a radially facing region and makes the pressure of sucked fluid high through the rotational driving of the actuator to discharge the high-pressure fluid,
   a rotational axis of the actuator, a rotational axis of the pump, and a rotational axis of the rotary valve are coaxially provided, and
   an end surface of the rotary valve forms a side wall of the pump chamber.

6. The driving power transmission device according to claim 1, wherein
   the first flow passage is provided with a drain port that communicates with the pump suction side when the switching valve is in the normal mode, and
   the driving power transmission device further comprises a flow control valve that is switchable between a state where the fluid is supplied from the pump to the clutch device side by closing the drain port when the switching valve is in the normal mode and the pump is driven and a state where the fluid is discharged from the first flow passage to the suction side of the pump by opening the drain port when the switching valve is in the normal mode and the pump is stopped.

7. The driving power transmission device according to claim 6, wherein
   the flow control valve is biased to the switching valve side by a biasing member,
   the flow control valve is provided with a throttle that makes the pressure of the fluid of the flow control valve on the clutch device side greater than the pressure of the fluid of the flow control valve on the switching valve side in a state where the fluid is supplied, and
   the flow control valve is moved to a position where the drain port is closed against a biasing force of the biasing member, by a pressure difference of the fluid.

8. The driving power transmission device according to claim 1, wherein
   the clutch device is applied to a differential gear with limited differential that distributes the driving power of a driving source to a drive shaft on a front wheel side and a drive shaft on a rear wheel side and limits the differential between the drive shaft on the front wheel side and the drive shaft on the rear wheel side, and
   the clutch device limits the differential between the drive shaft on the front wheel side and the drive shaft on the rear wheel side according to an engagement force.

9. The driving power transmission device according to claim 1, wherein
   the clutch device is provided between a drive shaft on a front wheel side and a drive shaft on a rear wheel side and distributes the driving power of a driving source to the front wheel side and the rear wheel side according to an engagement force.

10. The driving power transmission device according to claim 1, wherein
    the clutch device is applied to a differential gear with limited differential that distributes the driving power of a driving source to a drive shaft on a left wheel side and a drive shaft on a right wheel side and limits the differential between the drive shaft on the left wheel side and the drive shaft on the right wheel side, and the clutch device limits the differential between the drive shaft on the left wheel side and the drive shaft on the right wheel side according to an engagement force.

11. The driving power transmission device according to claim 1, further comprising:

an input shaft that receives driving power input from a driving source; and an auxiliary transmission that includes a cylinder device driven according to a fluid pressure difference between two partitioned regions, changes a speed change ratio of the driving power input to the input shaft, according to the position of a piston of the cylinder device, and transmits the changed driving power to a wheel, wherein the pump apparatus includes third and fourth flow passages that communicate with the respective regions of the cylinder device, and the switching valve is switchable among the normal mode, the locking mode, and an auxiliary transmission switching mode where the cylinder device is driven by making a discharge port and a suction port of the pump communicate within the third and fourth flow passages, respectively.

* * * * *